Dec. 10, 1940.   A. J. PENICK ET AL   2,224,446
VALVE MECHANISM
Filed Oct. 17, 1938   2 Sheets-Sheet 1

Inventors
ARTHUR J. PENICK
KIRBY T. PENICK
By
Edward V. Hardway
Attorney

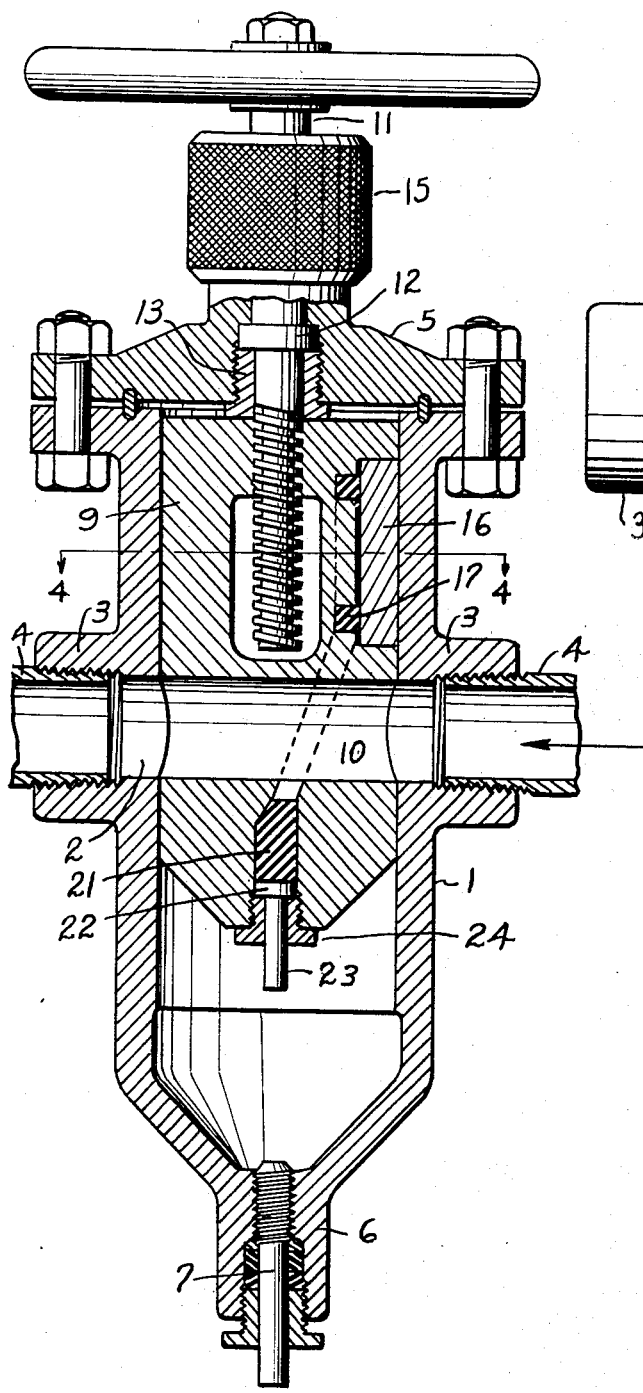

Patented Dec. 10, 1940

2,224,446

UNITED STATES PATENT OFFICE 2,224,446

VALVE MECHANISM

Arthur J. Penick and Kirby T. Penick, Houston, Tex.

Application October 17, 1938, Serial No. 235,387

4 Claims. (Cl. 251—62)

This invention relates to a valve and has particular relation to an assembly embodying a valve casing having a fluid passageway therethrough, a valve in the casing movable into one position to open the passageway and into another position to close the passageway with means for locking the valve in closed position and means whereby a fluid tight seal will be formed around the passageway, by the valve, when the valve is in closed position.

The invention embodies certain improvements over that type of construction disclosed in our co-pending application, Serial No. 186,625, filed January 24, 1938.

An object of the invention is to provide novel means embodied in the valve itself whereby a fluid tight relation between the valve and casing will be effected when the valve is in closed position.

Another object of the invention is to provide novel means whereby the valve may be maintained in closed position to permit removal and replacement of the valve bonnet and stem.

More specifically, the invention embodies a valve having a movable side section seated on a resilient seat within the valve with means for applying a compressive force to the seat, when the valve is in closed position to, in effect, increase the outside diameter of the valve to thereby cause it to fit more closely about the passageway through the casing to form fluid tight seals about said passageway.

With the above and other objects in view the invention has particular relation to certain novel features of construction, operation and arrangement of parts, an example of which is given in this specification and illustrated in the accompanying drawings, wherein:

Figure 3, shows a longitudinal, sectional view showing the valve in open position, and Figure 4 shows a cross-sectional view taken on the line 4—4 of Figure 3.

Figures 1, 2:
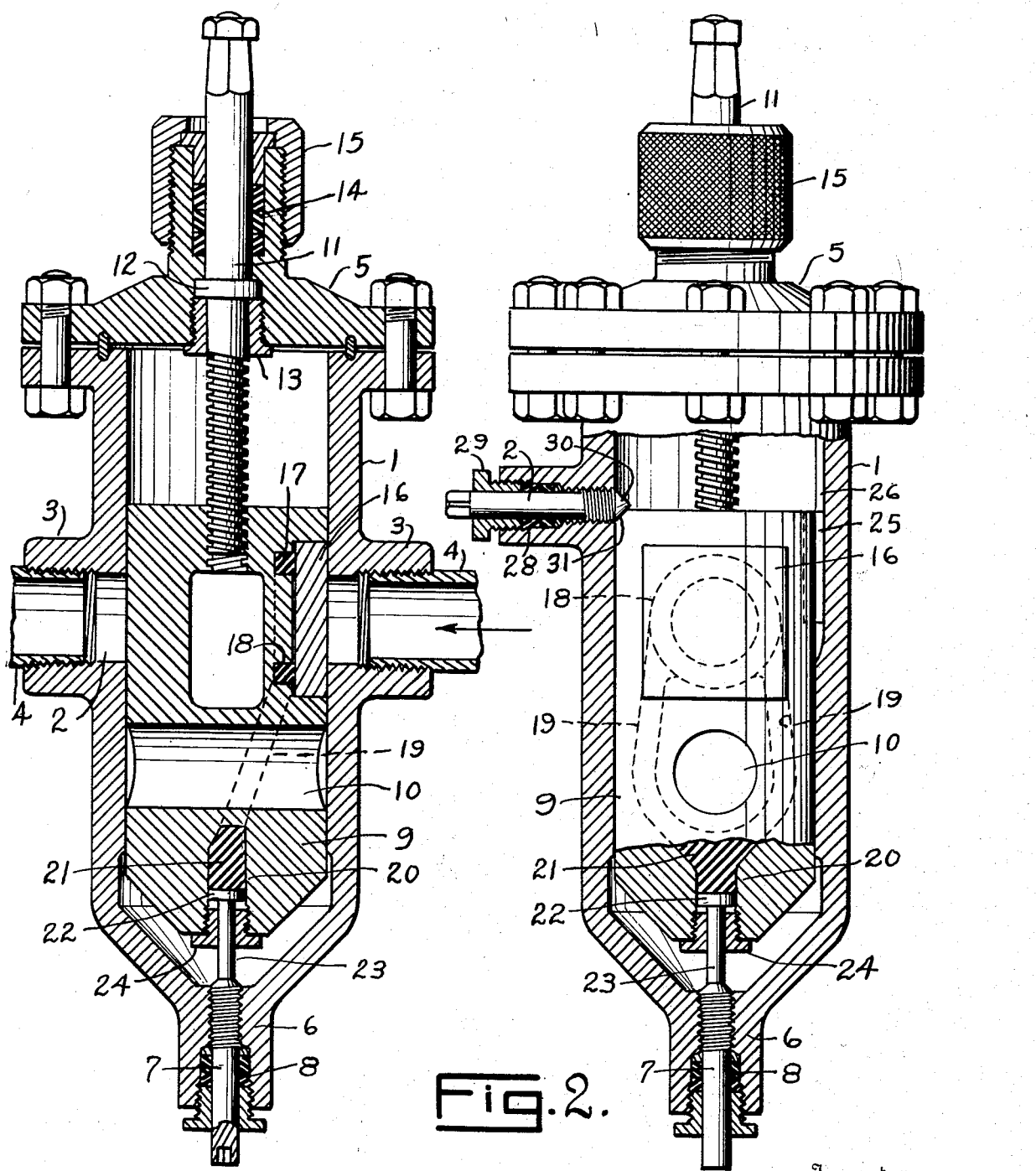
Figure 1 shows a longitudinal, sectional view of the assembly showing the valve in closed position.
Figure 2 shows a side elevation, partly in section, of the assembly showing the valve in closed position and taken at right angles to the view shown in Figure 1.

Referring now more particularly to the drawings wherein like numerals of reference designate the same parts in each of the figures, the numeral 1 designates the valve casing which is preferably of cylindrical shape in cross-section, as more clearly shown in Figure 4 and which has a passageway 2 for fluid therethrough. Around the passageway, on each side, are the tubular connections 3, 3 for connecting the casing into the adjacent sections 4 of the flow line. On one end of the valve casing there is a bonnet 5 which may be bolted or otherwise secured thereto. The opposite end of the casing terminates in an internally threaded extension 6 through which an adjustable stop 7 is threaded and said stop is surrounded by a conventional stuffing box 7.

Fitted into the casing there is a cylindrical valve 9 having a passageway 10 therethrough adapted to be brought into and out of registration with the passageway 2 through the casing. When the passageway 10 is aligned with the passageway 2, the valve will be open and a continuous smooth conduit will be provided through the assembly which will not collect detritus or other foreign matter. When the valve is moved to closed position a very tight seal will be formed by it around the passageway 2 to prevent leakage. The valve may be actuated into either of said positions by a rotatable stem 11 whose inner end has a coarsely threaded connection with the valve and whose outer end has a swiveling connection with the bonnet. This swiveling connection is provided by means of an annular rib 12 around the stem which is seated in the bonnet which is retained therein by a gland 13 which is screwed into the inner side of the bonnet as shown in Figures 1 and 2. Beyond the rib 12 the stem 11 is surrounded by a stuffing box 14 which is retained in place by the flange nut 15 screwed on to the outer end of the bonnet.

Countersunk into one side of the valve there is a movable section 16 forming a seat. This section is seated against a ring 17 formed of resilient material and seated in an annular groove 18 cut in the valve underneath the movable section 16 as shown. Leading from the groove 18 around the passageway 10 of the valve are the channels 19, 19, which merge in a common cylinder 20. Resilient material as 21 fills the channels 19, 19 and the cylinder 20 and operating against the material in the cylinder 20 there is a piston 22 which is fixed on the inner end of the stem 23. Surrounding this stem and screwed into the corresponding end of the valve there is a stuffing box 24. The outer end of the stem 23 is aligned with the inner end of the stop 7.

When the valve is in open position as shown in Figure 3 the resilient material 17, 21 will not be under compression so that the section, or seat, 16 will be relaxed and the valve may be readily moved to closed position to carry the seat 16 into alignment with the passageway 2 as shown in Figure 1. Just before the valve reaches its final closed position the outer end of the stem 23 will contact against the inner end of the stop 7 and upon final movement of the valve to closed position the plunger 22 will place the resilient material 21 and 17 under compression and the compressive force will force the seat 16 outwardly into close contact with the wall of the casing around the passageway 2. This will operate, by reaction, to force the valve 9 in the opposite direction and closely against the opposite side of the casing around the passageway 2. The outer surface of the seat 16 is flush, or approximately flush with the outer surface of the valve. It is to be noted that the valve is splined in the valve casing against rotation by means of the spline 25 but this spline has sufficient clearance in the key way 26 so that when the seat 16 is moved outwardly into close fitting relation with the valve casing around the passageway 2 the valve will have sufficient movement in the opposite direction to form a close fitting seal around said passageway on the opposite side of the valve casing.

At times it may be found desirable to lock the valve in closed position so that the bonnet 5 may be removed and repairs or replacements made. For this purpose a radially movable locking device has been provided. This locking device embodies a lock bolt 27, which is threaded radially through the casing 1 and which is surrounded by a packing 28, forming sealing means which is maintained under the required compression by the gland 29. The inner end 30 of the bolt 27 is tapered and when in active, or locking position, said tapered ends engages a correspondingly tapered face 31 on the corresponding end of the valve 9. When the bolt 27 is screwed inwardly into active position, its tapered end 30 engaging the tapered face 31 will force the valve inwardly and hold the stem 23 in contact with the inner end of the stop 7, thus maintaining the sealing means 17, 21 under compression so that the movable section, or, seat 16 will be held tightly against the inner wall of the casing around the passageway 2 for the purposes stated. It may be here noted that the movable section 16 is on the upstream side of the valve as indicated by the arrows, in Figures 1 and 3. It may be further noted that the stop 7 is made adjustable so that the compression on the sealing means 17 and 21 may be properly regulated.

During the ordinary operation of the valve, the bolt 27 is retracted as shown in Figure 4 so that its inner end will clear the valve to permit normal operations of the valve.

A preferred form of the valve assembly has been shown and described for the purpose of illustration. It is obvious however that mechanical changes may be made within the broad principle of the invention as defined by the appended claims.

What we claim is:

1. A valve assembly comprising a valve casing having a passageway therethrough for fluid, a valve in the casing movable to one position to open said passageway and to another position to close the passageway, a movable side section on the valve located to register with and close said passageway upon movement of the valve to closed position, said valve having a channel terminating at one end in a cylinder and extending underneath said movable section, resilient material filling said channel and extending into said cylinder, means arranged to act against said resilient material in the cylinder, upon movement of the valve to closed position, whereby the resilient material underneath said section will be expanded and said movable section thereby forced into close contact with the inside wall of the casing.

2. A valve assembly comprising a valve casing having a passageway therethrough for fluid, a valve in the casing movable to one position to open said passageway and to another position to close the passageway, a side section of the valve being movable and being located to register with and close said passageway upon movement of the valve to closed position, said valve having a channel terminating at one end in a cylinder and extending underneath said movable section, resilient material filling said channel and extending into said cylinder, means arranged to act against said resilient material in the cylinder, upon movement of the valve to closed position, whereby the resilient material will be placed under compression and said movable section thereby forced into close contact with the inside wall of the casing, said means including a plunger and a stop against which the plunger acts upon movement of the valve to closed position.

3. A valve assembly comprising a valve casing having a passageway therethrough for fluid, a valve in the casing movable to one position to open said passageway and to another position to close the passageway, a side section of the valve being movable and being located to register with and close said passageway upon movement of the valve to closed position, said valve having a channel terminating at one end in a cylinder and extending underneath said movable section, resilient material filling said channel and extending into said cylinder, means arranged to act against said resilient material in the cylinder, upon movement of the valve to closed position, whereby the resilient material will be placed under compression and said movable section thereby forced into close contact with the inside wall of the casing, said means including a plunger and an adjustable stop against which the plunger acts upon movement of the valve to closed position.

4. A valve assembly comprising a valve casing having a passageway therethrough for fluid, a valve fitted into the casing and movable to one position to open said passageway and to another position to close the passageway, a side section of the valve being movable and being located to register with and close the passageway upon movement of the valve to closed position, said valve having an annular channel therein located underneath the movable side section, said channel continuing on through the valve and terminating at one end thereof in a cylinder, resilient material filling said channels and partly filling the cylinder, means arranged to act against the resilient material in the cylinder upon movement of the valve to closed position whereby the resilient material in the cylinder and in the channels will be placed under compression and said movable section thereby forced into close contact with the inside wall of the casing, said means including a plunger and a stop against which the plunger acts upon movement of the valve to closed position.

ARTHUR J. PENICK.
KIRBY T. PENICK.